(12) United States Patent
Trevino

(10) Patent No.: US 10,792,987 B1
(45) Date of Patent: Oct. 6, 2020

(54) PROTECTIVE COVER FOR VEHICLES

(71) Applicant: Abel Trevino, San Antonio, TX (US)

(72) Inventor: Abel Trevino, San Antonio, TX (US)

(*) Notice: Subject to any disclaimer, the term of this patent is extended or adjusted under 35 U.S.C. 154(b) by 0 days.

(21) Appl. No.: 16/393,141

(22) Filed: Apr. 24, 2019

(51) Int. Cl.
*B60J 11/04* (2006.01)
*B32B 7/022* (2019.01)

(52) U.S. Cl.
CPC .............. *B60J 11/04* (2013.01); *B32B 7/022* (2019.01); *B32B 2250/03* (2013.01)

(58) Field of Classification Search
CPC ................................. B60J 11/04; B32B 7/022
USPC ............ 296/136.01, 136.02, 136.03, 136.07, 296/136.08, 136.09, 136.1, 136.11
See application file for complete search history.

(56) References Cited

U.S. PATENT DOCUMENTS

| | | | | |
|---|---|---|---|---|
| 5,097,638 A * | 3/1992 | Jones | ...................... | B60J 11/00 215/372 |
| 6,394,528 B2 * | 5/2002 | Hoenack | .................. | B60J 11/00 150/160 |
| 9,302,572 B2 | 4/2016 | Wang | | |
| 9,770,966 B1 | 9/2017 | Gill | | |
| 9,994,097 B2 | 6/2018 | Ching | | |
| 2003/0226627 A1 * | 12/2003 | Clark | ....................... | B60J 11/04 150/166 |
| 2007/0252406 A1 * | 11/2007 | Webber | ................... | B60J 11/00 296/136.12 |
| 2008/0174144 A1 * | 7/2008 | Coleman | .................. | B60J 11/06 296/136.02 |
| 2017/0087971 A1 * | 3/2017 | Hall | ......................... | B60J 11/04 |

* cited by examiner

*Primary Examiner* — Joseph D. Pape
(74) *Attorney, Agent, or Firm* — Sanchelima & Associates, P.A.; Christian Sanchelima; Jesus Sanchelima

(57) ABSTRACT

A protective cover for a vehicle is disclosed. The protective cover comprises a pad comprising a first layer, a second layer, and a third layer. The first layer is a waterproof outer layer. The second layer is an impact resistant layer. The third layer is a soft bottom layer. The pad is foldable at folding sections. The pad comprises a plurality of loops. The protective cover comprises at least one strap drawn through the plurality of loops. The protective cover further comprises a weighted ball device mounted at one end of a strap. The protective cover is placed over the vehicle and the strap is weighed down with the help of the weighted ball device mounted thereon. The weighted ball device is decoupled from the strap to allow ends of the strap to couple together. The pad protects the vehicle from objects falling onto or colliding with the vehicle.

4 Claims, 4 Drawing Sheets

PROTECTIVE COVER FOR VEHICLES

BACKGROUND OF THE INVENTION

1. Field of the Invention

The present disclosure generally relates to a field of protective covers for vehicles. More specifically, the present disclosure relates to a protective cover for use with a vehicle to protect the vehicle from objects falling onto or colliding with the vehicle.

2. Description of the Related Art

It is known that covers made up of hard or soft materials are used to protect vehicles from natural elements both indoors and outdoors. Most of the covers that are available are only suitable for protecting the vehicle from moderate conditions such as the sun and wind. However, the covers are not suitable for protecting the vehicle during extreme weather conditions such as sleet and hail. As known, the sleet and hail can cause damage to a glass i.e., windowpane or windshield of the vehicle and exterior surface of the vehicle.

In order to protect the glass and the exterior surface of the vehicle, several attempts have been made in the past. Most of the solutions include providing a protective car cover, which can be placed over the vehicle.

One such example is disclosed in a U.S. Pat. No. 9,994,097. In U.S. Pat. No. 9,994,097B2, it is disclosed that a hail-resistant cover for a vehicle is provided which may include a plurality of cover panels, each cover panel including a cover panel sleeve and an impact resistant cover panel insert. The cover panels may be affixed to each other by flexible cover panel joints which allow the cover panels to fold over onto the adjacent cover panels. The cover may also include anchors for anchoring the cover to the top of the vehicle. In some embodiments, the cover panels are removably affixed to the adjacent cover panels.

Another example is disclosed in U.S. Pat. No. 9,770,966. In U.S. Pat. No. 9,770,966B1, it is disclosed that an impact resistant cover for a vehicle including a set of top pads, a set of left pads and right pads, a front pad, and a rear pad. Each pad includes a waterproof outer layer, an impact resistant middle layer, a soft bottom layer, and hook and loop fasteners. Each left, right, front and read pad includes a strap with a hook. The pads removably attach to each other to form the cover. The strap and hook secure the cover to the vehicle. The impact resistant middle layer absorbs the force delivered by the hail. The soft bottom layer prevents damage to the vehicle by the cover. The cover is modular so that any number of pads may be used to accommodate vehicles of different sizes and shapes. The impact resistant middle layer can be composed of polystyrene foam, fiberboard, air bubble plastic, or an inflatable rubber bladder.

Another example is disclosed in a United States patent application 20180236859. In US20180236859A1, it is disclosed that a Hail Veil is a hail protection device that attaches to the strongest areas of a vehicle frame to support four rods; one at the very front of the car, one at the back of the car and two on the roof. Mesh is then strategically attached to the front, top, back and sides of the vehicle and fastened to create a barrier to the hail. The Hail Veil is portable and fits into the trunk of the vehicle for quick access.

Yet another example is disclosed in a U.S. Pat. No. 9,302,572. In U.S. Pat. No. 9,302,572B2, it is disclosed that the present invention includes a durable, weather resistant, and light weight apparatus for covering a vehicle and providing protection from objects that might strike and damage the exterior surfaces of the vehicle. The object of this invention is to provide a vehicle cover which covers both the horizontal and vertical surfaces of a vehicle, which can deployed by a single person, folded for easy deployment, retrieval and storage, and which can be stretched or compressed to fit various sizes of automobiles while maintaining its protective effectiveness.

Although the above disclosures or designs are helpful in protecting the vehicle from objects falling onto or colliding with the vehicle, they have few disadvantages. For instance, the protective covers discussed above are mostly made up of hard materials and as a result, it may lead to spending significant time to put on the protective cover over the vehicle. Further, it is difficult to fold the protective cover upon use.

Other documents describing the closest subject matter provide for a number of more or less complicated features that fail to solve the problem in an efficient and economical way. None of these patents suggest the novel features of the present invention. Specifically, none of the disclosures in the art disclose a protective cover, which is made up of a semi-rigid structure, and the protective cover that can be used to protect the vehicle from objects falling onto or colliding with the vehicle.

Therefore, there is a need in the art for a protective cover to protect the vehicle from objects falling onto or colliding with the vehicle.

SUMMARY OF THE INVENTION

It is one of the main objects of the present invention to provide a protective cover for a vehicle and avoids the drawbacks of the prior art.

It is one object of the present invention to provide a protective cover to protect the vehicle from objects falling onto or colliding with the vehicle.

It is one object of the present invention to provide a protective cover for a vehicle. The protective cover comprises a pad comprising a first layer, a second layer, and a third layer. The first layer is a waterproof outer layer. The second layer is an impact resistant layer. The third layer is a soft bottom layer. The pad is foldable at folding sections. The pad comprises a plurality of loops. The protective cover comprises at least one strap drawn through the plurality of loops. The protective cover further comprises a weighted ball device mounted at one end of a strap. The protective cover is placed over the vehicle and the strap is weighed down with the help of the weighted ball device mounted thereon. The weighted ball device is decoupled from the strap once both ends of the strap are to be connected. The pad protects the vehicle from objects falling onto or colliding with the vehicle.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a protective cover for a vehicle. The protective cover comprises a pad comprising a first layer, a second layer, and a third layer. The first layer is a waterproof outer layer. The second layer is an impact resistant layer. The third layer is a soft bottom layer. The pad is foldable at folding sections. The pad comprises a plurality of loops. The protective cover comprises at least one strap drawn through the plurality of loops. The protective cover further comprises a weighted ball device mounted at one end of a strap. The protective cover is placed over the vehicle and the strap is weighed down with the help of the weighted ball device mounted thereon. The weighted ball device is decoupled from the strap once both ends of the strap are to be connected together. The pad protects the vehicle from objects falling onto or colliding with the vehicle.

Various features and embodiments of a protective cover for a vehicle are explained in conjunction with the description of FIGS. 1-4.

Figure 1:
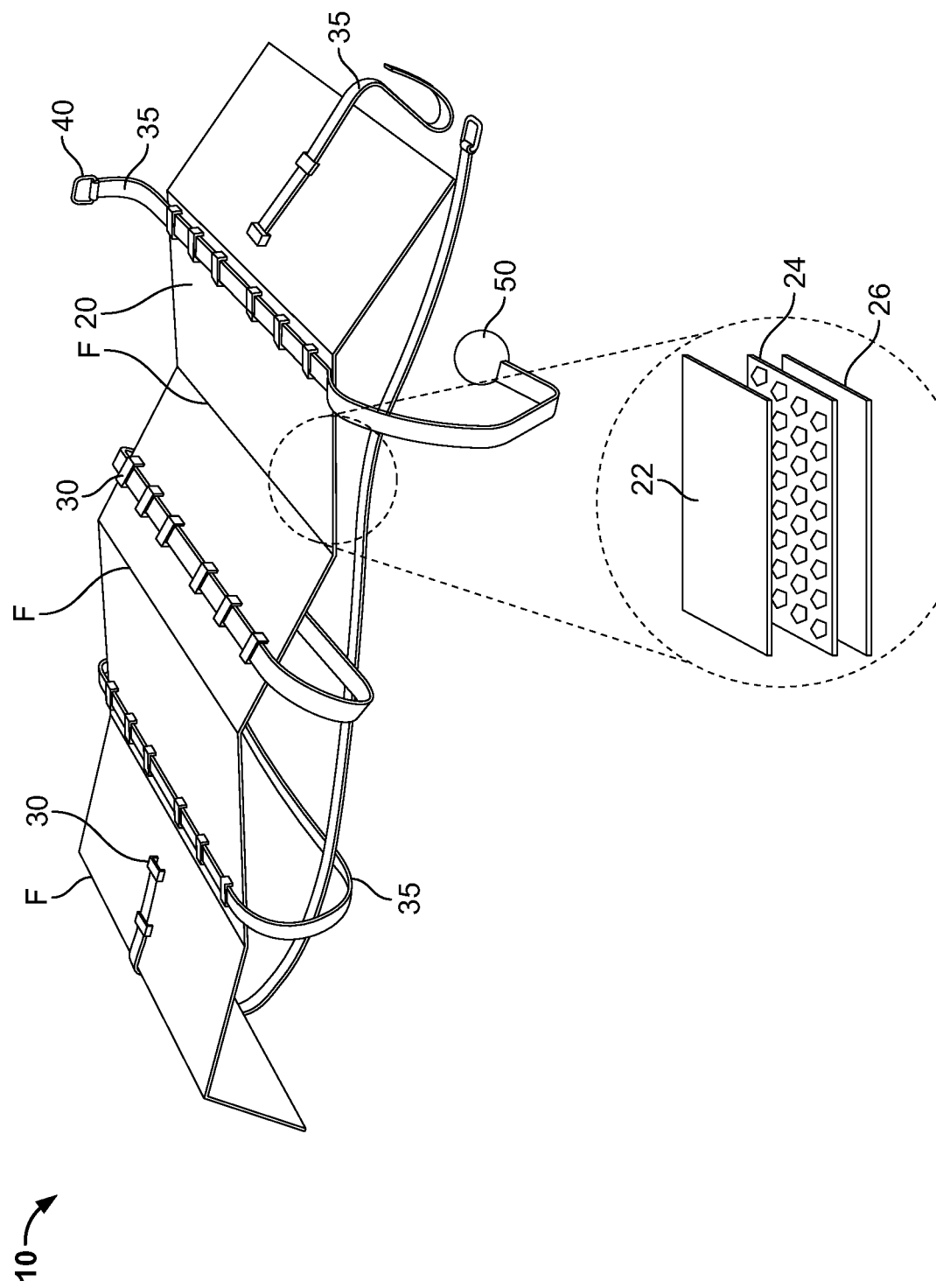
FIG. 1 illustrates a perspective view of a protective cover 10, in accordance with one embodiment of the present disclosure.

Referring to FIG. 1, a perspective view of a protective cover 10 that can be used to protect a vehicle from objects falling onto or colliding with the vehicle is shown, in accordance with one embodiment of the present disclosure. The protective cover 10 comprises a sheet or pad 20 made up of semi-rigid material. It should be understood that the protective cover 10 in an alternate embodiment can be made to be disposable, that is to mean it is intended for a one-time use, while still providing sufficient protection. Otherwise, it is appreciated that the protective cover 10 is reusable and can be easily stored for future use in most embodiments of the present invention.

The pad 20 might be made up of one or more layers. In one example, the pad 20 may comprise three layers i.e., a first layer 22, a second layer 24, and a third layer 26. The first layer 22 may indicate a top or outer layer made up of water-resistant fabric. In other words, the first layer 22 comprises a waterproof outer layer. The second layer 24 may indicate a middle or center layer composed of flexible bubbled plastic material. In other words, the second layer 24 comprises an impact resistant layer composed of polystyrene foam, fiberboard, air bubble plastic, or an inflatable rubber bladder. The third layer 26 may indicate a bottom layer or inner layer formed of a pasteboard material. In other words, the third layer 26 comprises a soft bottom layer. The third layer 26 may be made from any non-stick material, including, but not limited to: wax paper, Teflon coated material, Calphalon LRS coated material, Calphalon LRS3 coated material, and nonstick polypropylene. It should be understood that one of the first layer 22, the second layer 24 and the third layer 26 might be made from a material that provides an amount of stiffness to the pad 20. Such material may include, but is not limited to: foam, rubber, nylon, plastic, carbon composite. It must be noted that the pad 20 should be stiff enough to hold its shape, for easy transport and storage.

As can be seen from FIG. 1, it should be understood that the pad 20 is foldable or bendable at plurality of folding sections F. It should be noted that the pad 20 might be bendable to form one or more shapes such as square, rectangle or any other shape. It should be understood that the pad 20 at the foldable section F might be made of plastic, fabric, or any other material durable enough to withstand hail and severe storms, while also being flexible enough to function as a type of hinge that allows the pad 20 to bend about the joint formed therein.

Further, the pad 20 comprises a plurality of holes or loops 30. The plurality of loops 30 might be provided at center, sides or corners of the pad 20. As can be seen in FIG. 1, the plurality of loops 30 might be provided in a series in horizontal and/or vertical configuration. Further, it should be understood that the plurality of loops 30 might be provided in equal distance form one another. Alternatively, the plurality of loops 30 might be provided at varied distances from one another. The plurality of loops 30 might be coupled to the pad 20 using known mechanisms such as Velcro, adhesive or might be sewn.

Further, the protective cover 10 may comprise at least one strap 35 drawn through the plurality of loops 30 provided at the pad 20. The at least one strap 35 might be made up of rigid or semi-rigid materials that are known in the art. As can be seen from FIG. 1, the protective cover 10 may comprise a clip or buckle or hook 40, mounted to the at least one strap 35. The clip 40 may comprise a lever (not shown) coupled with a spring (not shown) used to couple or mount the clip 40 to the at least one strap 35.

Further, the protective cover 10 may comprise a weighted ball device 50. The weighted ball device 50 might be made up of hard material such as metal or stone. In one example, the weighted ball device 50 may weigh about 1 lb to 4 lb. In one example, the weighted ball device 50 might be made up of hard material and a soft material may be provided at outer layer such that the weighted ball device 50 does not cause scratches or damage to other objects including the vehicle 70 when coming in contact with the weighted ball device 50. The weighted ball device 50 might comprise a hook or connecting means (not shown) provided at top of the weighted ball device 50. The weighted ball device 50 might be coupled to the at least one strap 35 using connecting means which may include, but not limited to slips, buckles, hooks or loop fasteners, provided at the weighted ball device 50.

Figure 2:
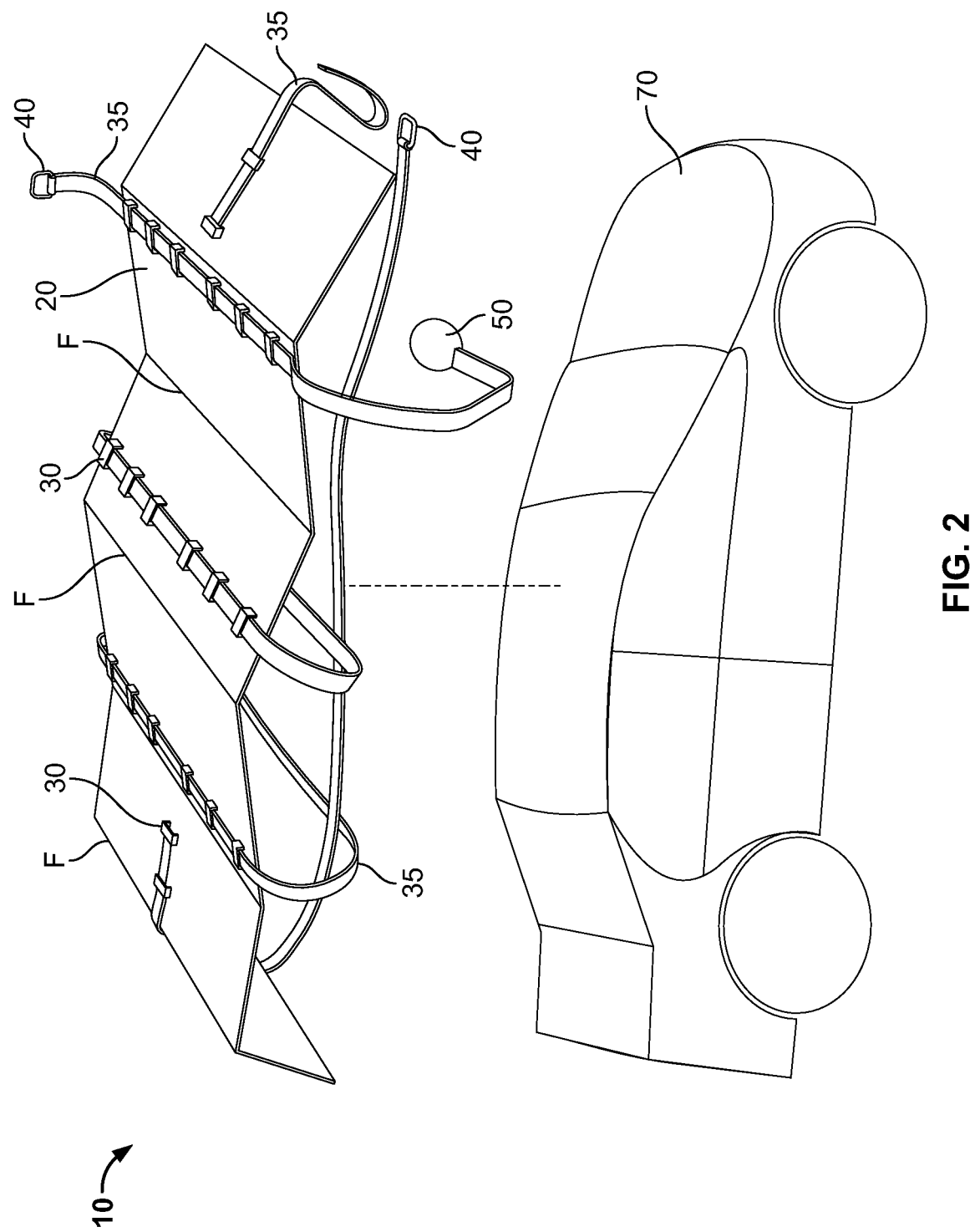
FIG. 2 illustrates shows the protective cover 10 aligned with a vehicle 70, in accordance with one embodiment of the present disclosure.

Now referring to FIG. 2, the protective cover 10 aligned with a vehicle 70 is shown, in accordance with one embodiment of the present disclosure. The vehicle 70 might include a car, semi truck, truck, bus, or any other vehicle. Although, it is shown that the vehicle 70 is a car, it is obvious to a person skilled in the art to provide the protective cover 10 in different shapes and sizes depending on a type of the vehicle 70 used.

Figure 3:
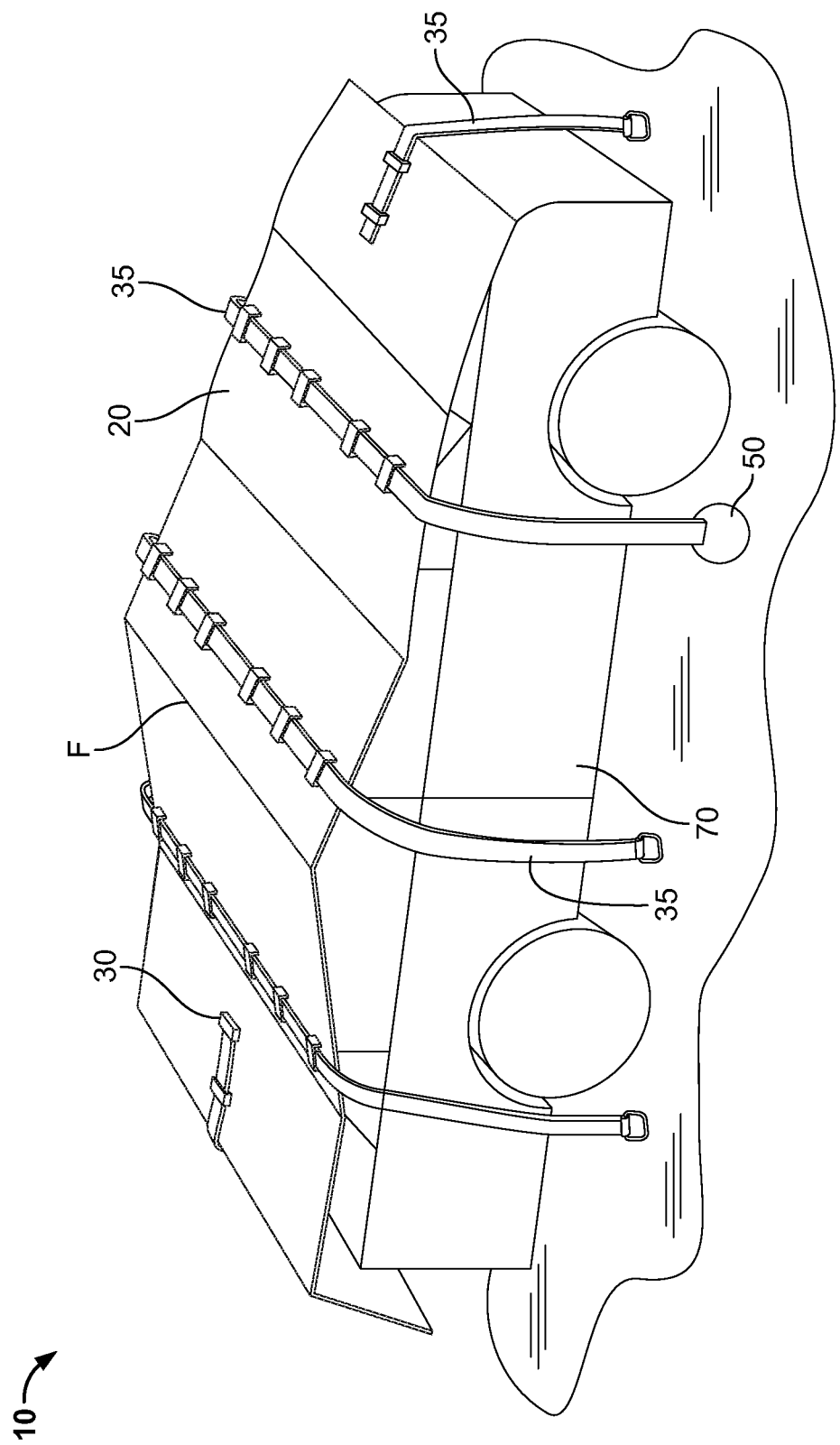
FIG. 3 illustrates the protective cover 10 placed over the vehicle 70, in accordance with one embodiment of the present disclosure.

Now referring to FIG. 3, mounting of the protective cover 10 over the vehicle 70 is explained, in accordance with one embodiment of the present disclosure. In order to place the protective cover 10 over the vehicle 70, at first, a user of the vehicle 70 may place the pad 20 over the vehicle 70. Subsequently, the at least one strap 35 is drawn through the plurality of loops 30 provided at the pad 20. Subsequently, the at least one strap 35 is coupled to the weighted ball device 50. Subsequently, the ends of at least one strap 35 are tossed underneath the vehicle 70 and the weighted ball device 50 attached is used to weigh down the at least one strap 35. In other words, when the portion of the at least one strap 35 comprising the weighted ball device 50 is placed underneath vehicle 70, the pad 20 is retained over the vehicle 70 and it becomes easy for the user to align one end of the at least one strap 35 with another end. Subsequently, the user may decouple the weighted ball device 50 from the at least one strap 35 and tie or couple the strap ends.

As can be seen from FIGS. 1, 2 and 3, there could be more than one at least one strap 35 that can be drawn the plurality of loops 30 depending on direction in which the plurality of loops 30 are provided. As such, upon completion of coupling ends of the at least one strap 35, the user may couple the weighted ball device 50 to another of said at least one strap 35 and repeat the above process to tie each of the at least one strap 35. This way, the user can mount the protective cover 10 over the vehicle 70 without help from other users. In other words, one user can tie the at least strap 35 to mount the protective cover 10 over the vehicle 70. It should be understood that the weighted ball device 50 helps the user to weight down the at least one strap 35 while he is trying to align the other end of the respective strap. Without the weighted ball device 50, the at least one strap 35 may move freely due to their negligible or less weight and it might be difficult for the user to tie the ends of the at least one strap 35.

As specified above, the protective cover 10 can be provided in variety of shapes in that the top portion of the vehicle 70 i.e., roof, windshield, windowpanes, bonnet, and rear of the vehicle 70 is covered with the protective cover 10.

As specified above, the pad 20 comprises the first layer 22, the second layer 24, and the third layer 26 made up of water-resistant fabric (waterproof outer layer), flexible bubbled plastic material (impact resistant layer), and pasteboard material (soft bottom layer), respectively. As such, the first layer 22 ensures that the pad 20 is water resistant and therefore prevents water from entering the surface of the vehicle 70. Further, the second layer 24 absorbs the impact of the objects such as hail or sleet falling onto the vehicle 70 during extreme weather conditions. Further, the third layer 26 prevents damage to the vehicle 70 by the pad 20.

After use, in order to remove the protective cover 10 from the vehicle 70, the user of the vehicle 70 may decouple the at least one strap 35. Subsequently, the user may remove the at least one strap 35 from the plurality of loops 30 of the pad 20. Subsequently, the user may fold the pad 20 at the foldable sections F and store the protective cover 10 in the vehicle 70.

At the time of removing, the user may couple the weighted ball device 50 to one of the at least one strap 35 so that the pad 20 is not displaced from its position. Further, one or more of the weighted ball devices 50 may be used to couple to the at least one strap 35 so that the at least one strap 35 that are removed remain firmly in place.

Figure 4:
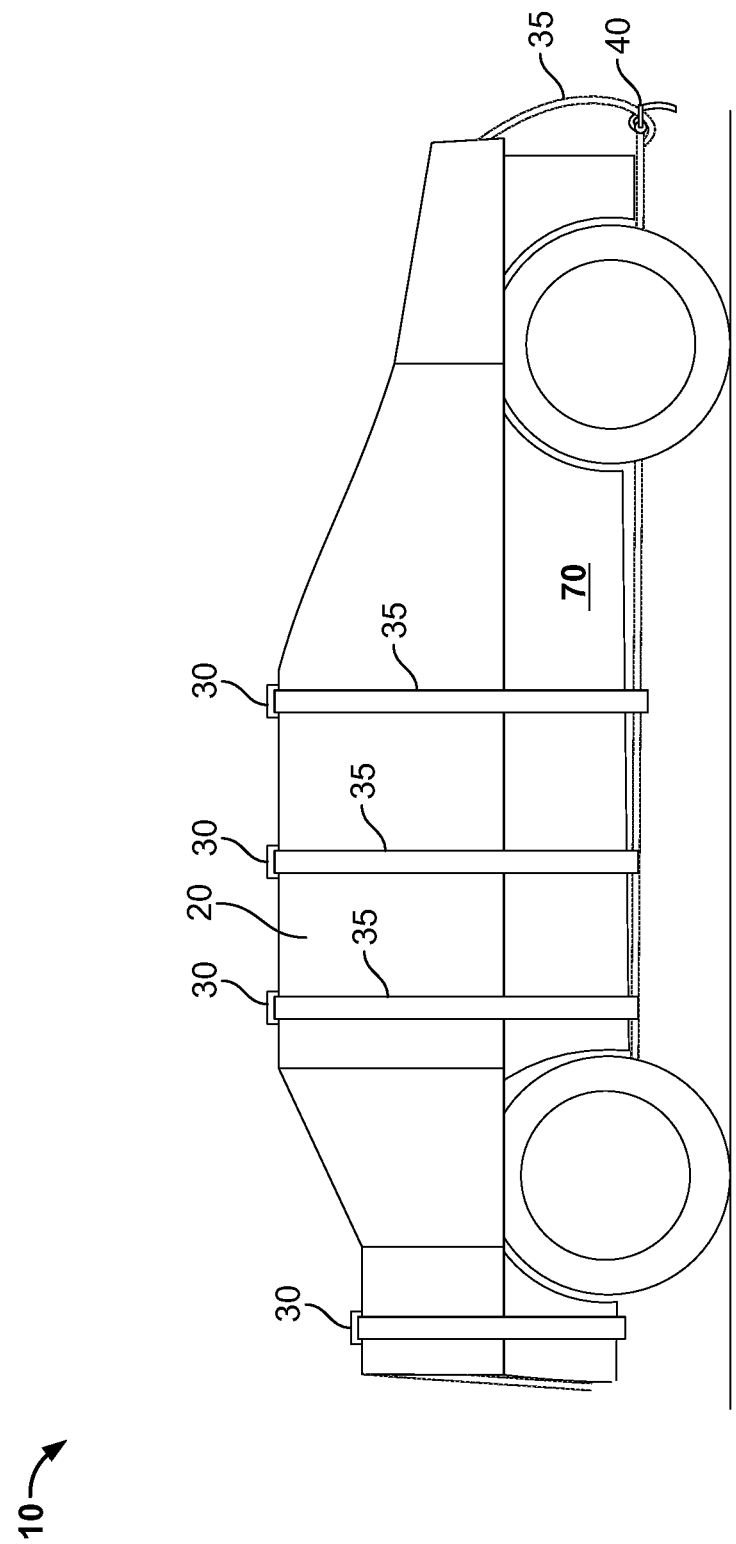
FIG. 4 illustrates a side view of the protective cover 10 used to protect the vehicle 70, in accordance with another embodiment of the present disclosure.

Referring to FIG. 4, a side view of the protective cover 10 used to protect the vehicle 70 is shown, in accordance with one embodiment of the present disclosure. As specified above, the pad 20 is placed over the vehicle 70 and the at least one strap 35 are drawn from the sides, front and rear of the vehicle 70. Subsequently, the at least one strap 35 are drawn underneath the vehicle 70 and the at least one strap 35 are coupled using the buckles or clips 40 provided at one end. Subsequently, the at least one strap 35 is placed or tossed underneath the vehicle 70 and ends of the at least one strap 35 are coupled with the help of the weighted ball device 50 to mount the pad 20 over the vehicle 70, as explained above. As such, it is ensured that the protective cover 10 remains on the vehicle 70 during extreme weather conditions such as during windy or rainy seasons, sleet or hail.

Based on the above, it is evident that the protective cover can be used to protect the vehicle from objects falling onto or colliding with the vehicle. As such, the protective cover can be used when the vehicle is parked outdoors to protect the vehicle from sleet, hail and other objects falling onto the vehicle.

As explained above, the pad is made up of three layers comprising a waterproof outer layer, an impact resistant layer, and a soft bottom layer. The waterproof outer layer helps in preventing liquid to come in contact with surface of the vehicle. Further, the impact resistant layer helps in absorbing the impact caused by the objects falling onto the vehicle. Furthermore, the soft bottom layer resists remaining forces of the objects falling onto the vehicle and ensures that the surface of the vehicle is not scratched or damaged due to placement of the pad on top of the vehicle.

Further, as the protective cover i.e., the pad is made up semi-rigid material, it is easy to assemble and secure to the vehicle and is easy to disassemble and store. Further, the pad is flexible so that it is easy to use the protective cover to protect any type of vehicle from the objects falling onto the vehicle.

In addition, use of the weighted ball device is unique in that the weighted ball device allows a single user to couple the ends of the straps at the time of coupling or decoupling the protective cover to the vehicle.

It should be noted that the terms "first", "second", and "third", and the like may be used herein to modify elements performing similar and/or analogous functions. These modifiers do not imply a spatial, sequential, or hierarchical order to the modified elements unless specifically stated.

Although it is explained that the protective cover is used to protect the vehicle from objects falling onto, it is obvious to a person skilled in the art to provide the protective cover in different shapes and sizes to protect other items or surfaces including but not limited to motorcycles, bicycles, tables, fixtures and furniture or may be spread out and used as a blanket for people to rest upon.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A protective cover for a vehicle, said protective cover comprising:
    a pad comprising a first layer, a second layer, and a third layer, wherein the first layer is a waterproof outer layer, wherein the second layer is an impact resistant layer, wherein the third layer is a soft bottom layer, wherein the pad is foldable at folding sections, wherein the pad comprises a plurality of loops;
    at least one strap drawn through the plurality of loops; and
    a weighted ball device, wherein the pad is placed over the vehicle, wherein the weighted ball device is coupled to one end of the at least one strap and the pad of the protective cover is tossed over the vehicle such that the at least one strap is weighed down with the help of the weighted ball device, wherein the weighted ball device is decoupled from the at least one strap to allow both ends of the at least one strap to connect together and wherein the pad protects the vehicle from objects falling onto or colliding with the vehicle.

2. The protective cover of claim 1, further comprises a clip to mount the weighted ball device to the at least one strap.

3. The protective cover of claim 1, wherein the weighted ball device comprises a hook to mount the weighted ball device to the at least one strap.

4. The protective cover of claim 1, wherein the pad is made up of a semi-rigid material.

\* \* \* \* \*